United States Patent
Lundström

(10) Patent No.: US 10,544,743 B2
(45) Date of Patent: Jan. 28, 2020

(54) METHOD AND SYSTEM FOR DIAGNOSING AN AFTERTREATMENT SYSTEM

(71) Applicant: Scania CV AB, Södertälje (SE)

(72) Inventor: Mikael Lundström, Hägersten (SE)

(73) Assignee: Scania CV AB, Södertälje (SE)

(*) Notice: Subject to any disclaimer, the term of this patent is extended or adjusted under 35 U.S.C. 154(b) by 67 days.

(21) Appl. No.: 15/767,338

(22) PCT Filed: Oct. 27, 2016

(86) PCT No.: PCT/SE2016/051047
§ 371 (c)(1),
(2) Date: Apr. 10, 2018

(87) PCT Pub. No.: WO2017/074252
PCT Pub. Date: May 4, 2017

(65) Prior Publication Data
US 2018/0298834 A1    Oct. 18, 2018

(30) Foreign Application Priority Data
Oct. 28, 2015   (SE) .................................. 1551386-4

(51) Int. Cl.
*F01N 11/00* (2006.01)
*F02D 41/02* (2006.01)
(Continued)

(52) U.S. Cl.
CPC ......... *F02D 41/0235* (2013.01); *F01N 3/208* (2013.01); *F01N 9/00* (2013.01);
(Continued)

(58) Field of Classification Search
CPC .... F01N 3/2066; F01N 3/208; F01N 2550/05; F01N 2610/02; F01N 2900/1818; F02D 2041/227; F02D 2250/26
See application file for complete search history.

(56) References Cited

U.S. PATENT DOCUMENTS

| 7,842,267 B2 | 11/2010 | Nishina et al. |
| 9,016,046 B2 | 4/2015 | Harmsen et al. |

(Continued)

FOREIGN PATENT DOCUMENTS

| CN | 103184916 A | 7/2013 |
| DE | 102010002610 A1 | 9/2011 |

(Continued)

OTHER PUBLICATIONS

International Search Report for PCT/SE2016/051047 dated Jan. 11, 2017.
(Continued)

*Primary Examiner* — Jonathan R Matthias
(74) *Attorney, Agent, or Firm* — Moore & Van Allen PLLC; W. Kevin Ransom

(57) ABSTRACT

The present invention relates to a method for restricting work produced in a combustion chamber, wherein a substance resulting from combustion is reduced by supplying additive comprising a reagent to the exhaust gas stream. The method comprising: determining if a quality of said additive, estimated by means of a first sensor, being subjected to said additive, is below a first quality; determining if signals from a second sensor, being subjected to the exhaust gas stream, indicate insufficient reduction of said at least one substance; determining if a correction of the supply of additive has reached an upper limit; and restricting work produced by combustion only when: said estimated quality of said additive is below said first quality, said correction has reached said upper limit, and said measurement in the exhaust gas stream indicates insufficient reduction.

15 Claims, 6 Drawing Sheets

(51) Int. Cl.
*F01N 3/20* (2006.01)
*F02D 41/14* (2006.01)
*F01N 9/00* (2006.01)
*F02D 41/22* (2006.01)

(52) U.S. Cl.
CPC .......... *F01N 11/00* (2013.01); *F02D 41/1463* (2013.01); *F01N 2550/02* (2013.01); *F01N 2560/026* (2013.01); *F01N 2560/14* (2013.01); *F01N 2610/02* (2013.01); *F01N 2900/0416* (2013.01); *F01N 2900/1818* (2013.01); *F02D 41/222* (2013.01)

(56) References Cited

U.S. PATENT DOCUMENTS

| 9,626,812 B2 | 4/2017 | See et al. | |
|---|---|---|---|
| 2015/0088362 A1* | 3/2015 | See | F01N 3/208 701/29.2 |
| 2017/0268398 A1* | 9/2017 | Han | F01N 11/00 |

FOREIGN PATENT DOCUMENTS

| DE | 112013002497 T5 | 1/2015 |
| EP | 1688599 A1 | 8/2006 |
| EP | 1830040 A1 | 9/2007 |
| FR | 2972489 A1 | 9/2012 |
| GB | 2518287 A | 3/2015 |
| JP | 2005147118 A | 6/2005 |
| JP | 2006009606 A | 1/2006 |

OTHER PUBLICATIONS

Written Opinion of the International Searching Authority for PCT/SE2016/051047 dated Jan. 11, 2017.
Scania CV AB, European Application No. 16860388.4, Extended European Search Report, dated Jun. 21, 2019.
Scania CV AB, International Application No. PCT/SE2016/051047, International Preliminary Report on Patentability, dated May 1, 2018.
Scania CV AB, Korean Application No. 10-2018-7013868, Office Action, dated Jul. 19, 2019.
Scania CV AB, Chinese Application No. 201680061327.7, First Office Action, dated Sep. 27, 2019.

* cited by examiner

000
METHOD AND SYSTEM FOR DIAGNOSING AN AFTERTREATMENT SYSTEM

CROSS-REFERENCE TO RELATED APPLICATION(S)

This application is a National Stage Application (filed under 35 § U.S.C. 371) of PCT/SE2016/051047, filed Oct. 27, 2016 of the same title, which, in turn claims priority to Swedish Application No. 1551386-4 filed Oct. 28, 2015 of the same title; the contents of each of which are hereby incorporated by reference.

FIELD OF THE INVENTION

The present invention relates to combustion processes, and in particular to a method and system and computer program product for diagnosing an aftertreatment system for treating exhaust gases resulting from combustion.

BACKGROUND OF THE INVENTION

With regard to vehicles in general, and at least to some extent heavy/commercial vehicles such as trucks, buses and the like, there is constantly ongoing research and development with regard to increasing fuel efficiency and reducing exhaust emissions.

This is often at least partly due to growing governmental concern in pollution and air quality, e.g. in urban areas, which has also led to the adoption of various emission standards and rules in many jurisdictions.

These emission standards often consist of requirements that define acceptable limits for exhaust emissions of vehicles being provided with internal combustion engines. For example, the exhaust levels of e.g. nitric oxides ($NO_x$), hydrocarbons (HC), carbon monoxide (CO) and particles are regulated for most kinds of vehicles in these standards.

The undesired emission of substances can be reduced by reducing fuel consumption and/or through the use of aftertreatment (purifying) of the exhaust gases that results from the combustion process.

Exhaust gases from the internal combustion engine can, for example be treated through the use of a so-called catalytic process. There exist various kinds of catalytic converters, where different types can be used for different kinds of fuel and/or for treatment of different kinds of substances occurring in the exhaust gas stream. With regard to at least nitric oxides $NO_x$ (such as, for example, nitric oxide NO and nitric dioxide $NO_2$, respectively) heavy vehicles often comprises a method where an additive is supplied to the exhaust gas stream. The additive is supplied in order to, usually through the use of a catalytic converter, reduce the presence of nitric oxides $NO_x$ to less pollutive substances (mainly nitrogen and water vapor).

One common kind of catalytic converter that is used in $NO_x$ reduction, where an additive, oftentimes urea based, is added to the exhaust gas stream, is Selective Catalytic Reduction (SCR) catalytic converters.

In the supplying of an additive for reduction of substances in an exhaust gas stream it is essential that the amount of additive that is supplied to the exhaust gas stream is neither too great nor too small. Consequently, it is desirable that the actually supplied amount of additive corresponds to an expected/desired amount of additive. Further, with regard to the reduction it is also important that the additive consists of an additive of an expected kind.

The chemical composition of an additive can be evaluated, for example, through the use of a quality sensor. When the quality sensor indicates a deviating quality of the additive, and/or broken sensor, regulations may require that vehicle performance restrictive measures are being taken. That is, inducements are applied to induce the driver to ensure that additive of appropriate quality and amount is supplied to the exhaust gas stream.

SUMMARY OF THE INVENTION

It is an object of the present invention to provide a method and system that reduces the occurrence of unduly restrictions of vehicle performance due to irregularities in the operation of an aftertreatment system. This object is achieved by a method according to claim 1.

According to the present invention, it is provided a method for restricting work produced by combustion in at least one combustion chamber, wherein an aftertreatment system is arranged for reduction of at least one substance resulting from said combustion by supplying an additive comprising a reagent to an exhaust gas stream resulting from said combustion, wherein the quantity of additive being supplied is subjectable to correction. The method comprises:
  determining if a quality of said additive, estimated by means of a first sensor being subjected to said additive, is below a first quality;
  determining if signals from a second sensor indicate insufficient reduction of said at least one substance, said second sensor being subjected to the exhaust gas stream and arranged to measure an occurrence of said at least one substance;
  determining if said correction has reached said upper limit; and
  restricting work produced by said combustion only when: said estimated quality of said additive is below said first quality, said correction has reached said upper limit, and said measurement in the exhaust gas stream indicates insufficient reduction of said at least one substance.

As was mentioned above, the presence of at least some substances (as is explained below, in the present description and claims, the term substance includes compounds as well) in an exhaust gas stream resulting from combustion can be reduced through the supply of an additive to the exhaust gas stream. A reagent of the additive then reacts with one or more of the substances occurring in the exhaust gas stream to thereby form less hazardous substances.

For example, the supply of additive can be used to reduce the concentration of nitric oxides $NO_x$ or other substances in exhaust gases resulting from combustion. It is, however, important that reagent is supplied to the exhaust gas stream in a proportion that corresponds to the presence of the one or more substances/compositions that is to be reduced in order to achieve the desired effect. It is also important that the additive comprises reagent of a kind that is capable of performing the desired reduction. If a wrong kind of reagent/additive is supplied, and/or if the supplied amount of reagent/additive is too small in relation to the presence of the substance/composition to be reduced, undesired surplus of the substance may still remain after the reduction and be emitted into the surroundings.

Conversely, if the amount of reagent being supplied to the exhaust gas stream is high in relation to the at least one substance/composition to be reduced, the supply of reagent may cause a surplus of other undesired substances instead. For example, with regard to $NO_x$ reduction using an additive comprising a reagent in the form of urea, a surplus of ammonium may be emitted into the surroundings. Ammonium is classified as a hazardous substance, and emissions of ammonium are also often regulated.

With regard to the additive the required supply to provide sufficient amount of reagent, and hence consumption, can be relatively high in order to obtain the desired reduction. For this reason, the cost for the consumption of additive, e.g. when used in a commercial vehicle, may have a significant impact on the vehicle economy. This may give rise to temptations to replace relatively expensive additive with less expensive liquids such as water. The use of such alternative liquids will, almost certainly, have a detrimental effect on the reduction of the exhaust emissions.

Therefore, in order to ensure that an additive of a desired quality and amount is provided to the exhaust gas stream, and to avoid replacement of additive with less suitable, but economically more favorable, alternatives, there are, presently and/or upcoming, at least in some jurisdictions requirements regarding onboard diagnostics (OBD). That is, the vehicle is required to be able to detect deviations with regard to quality of the additive and its supply during vehicle operation.

For example, in at least some jurisdictions it is, or will be, required that the vehicle is capable of evaluating, diagnosing, a property of the additive directly, such as chemical composition. This can be achieved, for example, through the use of suitable sensor means, such as a quality sensor, which can be arranged in the tank containing the additive, in the following referred to as dosing tank. By means of the quality sensor the chemical composition of the additive can be evaluated.

Furthermore, legislation may include inducements to provide the driver with incentive to ensure that proper additive is used. For example, in case a malfunction with regard to the reduction of a substance is detected, the vehicle control system may be required to take inducement measures regarding e.g. vehicle performance, oftentimes in terms of limiting the work produced by combustion. Inducement measures of this kind are often arranged to be effected only after some time has lapsed. For example, the vehicle control system may be arranged to reduce available power and/or maximum allowed vehicle speed to a substantial extent some suitable number of hours after the detection of a malfunction, the time limit being given e.g. to allow the vehicle to be taken to service or additive of proper quality to be refilled. Inducement measures of this kind, consequently, encourage the driver/owner to use additive of an appropriate kind to avoid vehicle driveability from being substantially reduced. For example, a malfunction with regard to the reduction may be considered to be present if the chemical composition of the additive deviates from accepted compositions, and/or if it is determined that the quality sensor is not working/functioning properly/correctly.

When a malfunction is detected with regard to the supply of additive the vehicle will, in general, be required to be taken to a repair shop for service to avoid undesired effects of the restrictive measures even if in reality the additive is of sufficient quality. However, if a detected malfunction in reality turns out to be erroneous, i.e. the reduction is in fact operating/functioning properly/correctly, e.g. due to erroneous sensor signals, restrictive measures according to the above may lead to costs and vehicle downtime that in reality are uncalled for. The present invention provides a method for reducing the occurrence of restricted vehicle performance due to a negative diagnostic evaluation in situations when the reduction is in fact working/functioning properly/correctly.

According to the invention, this is accomplished by requiring a plurality of indications of insufficient reduction. In particular, it is determined if a quality of the additive, estimated by means of a sensor being subjected to said additive, is below a first quality. The quality of the additive can be arranged to be estimated using a quality sensor, which can be arranged in a tank comprising the additive, and where the quality sensor can be arranged to diagnose at least one property with regard to the additive, such as a chemical composition of the additive. An indication of that the sensor is not working/functioning/operating properly/correctly can be used as an indication of insufficient quality of the additive, since no establishment of sufficient quality can be made using the sensor signals in this case.

In addition, it is determined if sensor signals from a sensor being subjected to the exhaust gas stream indicates insufficient reduction of said at least one substance. Also in this case, an indication of that the sensor is not working/functioning/operating properly/correctly can be used as an indication of insufficient reduction since no estimation of the reduction can be performed. According to one embodiment, it is determined that reduction is insufficient when sensor signals indicates a presence of the substance to be reduced that exceeds some suitable presence. For example, it can be determined that reduction is insufficient when the amount of the substance in the exhaust gas stream exceeds e.g. some number of grams per kWh produced by the internal combustion engine.

Finally it is determined, if a correction of the supply of additive has reached an upper limit.

With regard to the correction, there are various terms being used for denominating this functionality. For example, adaption or adaptation is often used when correction is performed at some suitable intervals. Alternative denotations are feedback and closed loop control where correction is performed at a more continuous basis.

The correction is a function where a predetermined amount of additive to be supplied for a given situation, such as for a certain operating condition or certain estimated generation of the substance to be reduced, is corrected to account for e.g. variations in the quality of additive being used and/or tolerances/wear of components being involved in the aftertreatment. The correction comprises a change in the predetermined amount, or quantity, to be injected. In general, the quantity being injected varies substantially from one moment in time to another, e.g. in dependence of current engine load and prevailing temperatures in the system. The correction is imposed in addition to such variations, and may e.g. consist of an increase or reduction of the intended quantity that has been determined on the basis of current system operating conditions.

For example, dilution of additive can be accounted for to some extent by increasing the amount of additive being supplied so that a correct amount of reagent may still be supplied. However, in general, there is a maximum, or upper, limit of the correction. That is the quantity to be injected for any given moment can be increased only to some extent. For example, the upper limit can be set to some percentage of the predetermined quantity. That is, if the maximum correction percentage is set e.g. to 50%, the predetermined quantity is increased maximally by 50%. If further increase than this is required, it is considered that enough compensation cannot be obtained by the correction. The percentage can be set to any suitable percentage, and the correction can also consist of a maximum quantity being added, where the percentage/quantity can be arranged to be different for different conditions.

Furthermore, when proper operation/function of said correction of the supply of additive is not indicated, i.e. when it is determined that the correction function is not working/functioning/operating properly/correctly, this can be regarded as the correction has reached the upper limit and hence the criterion for restricting work produced by the internal combustion engine being fulfilled in this regard.

When none of the above tests indicates sufficient reduction work of the internal combustion engine is restricted. Consequently, according to the invention, it is required that plural indications indicate insufficient reduction of the substance to be reduced, in order for work produced by said combustion to be restricted.

Consequently, the invention provides a method that will not take restrictive measures, such as e.g. legislative inducements, only because inferior quality of the additive is indicated, but restrictive measures are only taken when further criteria according to the above are fulfilled. In this way, situations where restrictive measures are taken e.g. due to a faulty sensor can be avoided.

The restriction of said combustion can be a restriction of the maximum power delivered by said combustion.

The at least one combustion chamber can be a combustion chamber of an internal combustion engine in a vehicle, said restriction of said combustion being such that a maximum power of said internal combustion engine is restricted and/or such that the maximum speed of said vehicle is limited to a first vehicle speed.

The work produced by said combustion can be arranged to be restricted only when a first period of time has lapsed since insufficient reduction of said at least one substance has been determined. This first period of time can, for example, be at least one hour. In this way e.g. a vehicle is allowed to be driven to a service station or other location for service or refill of additive.

The supplying of said first additive can be arranged to be performed upstream a first catalytic converter. This catalytic converter can be arranged to be a selective catalyst reduction (SCR) catalytic converter.

Furthermore, the substance being reduced can be any substance. According to embodiments of the invention, the substance being reduced is at least nitric oxides (NOx).

The invention also relates to a system corresponding to the method set forth above. The system is characterized in means carrying out features of the invention. Such means for carrying out features of the invention can consist of any suitable means, and the means can be specifically adapted to perform the features set forth in the system claims. Such means can consist of one or more control units, or other electrical, mechanical and/or electromechanical elements or arrangements.

Further characteristics of the present invention and advantages thereof are indicated in the detailed description of exemplary embodiments set out below and the attached drawings.

BRIEF DESCRIPTION OF THE DRAWINGS

The invention will be illustrated in more detail below, along with the enclosed drawings.

DETAILED DESCRIPTION OF THE INVENTION

In the following detailed description the present invention will be exemplified for a vehicle. The invention is, however, applicable also in other kinds of transportation means, such as air and water crafts. The invention is also applicable in fixed installations.

Furthermore, the present invention is exemplified below for a urea based additive for reduction of nitric oxides. The present invention is, however, applicable for any kind of suitable additive, where the additive can be arranged for reduction of any substance/compound in the exhaust gas stream, and hence not necessarily nitric oxides.

Further, in the present description and the appended claims the expression "substance" is defined to include chemical compounds as well as mixtures.

Figure 1A:
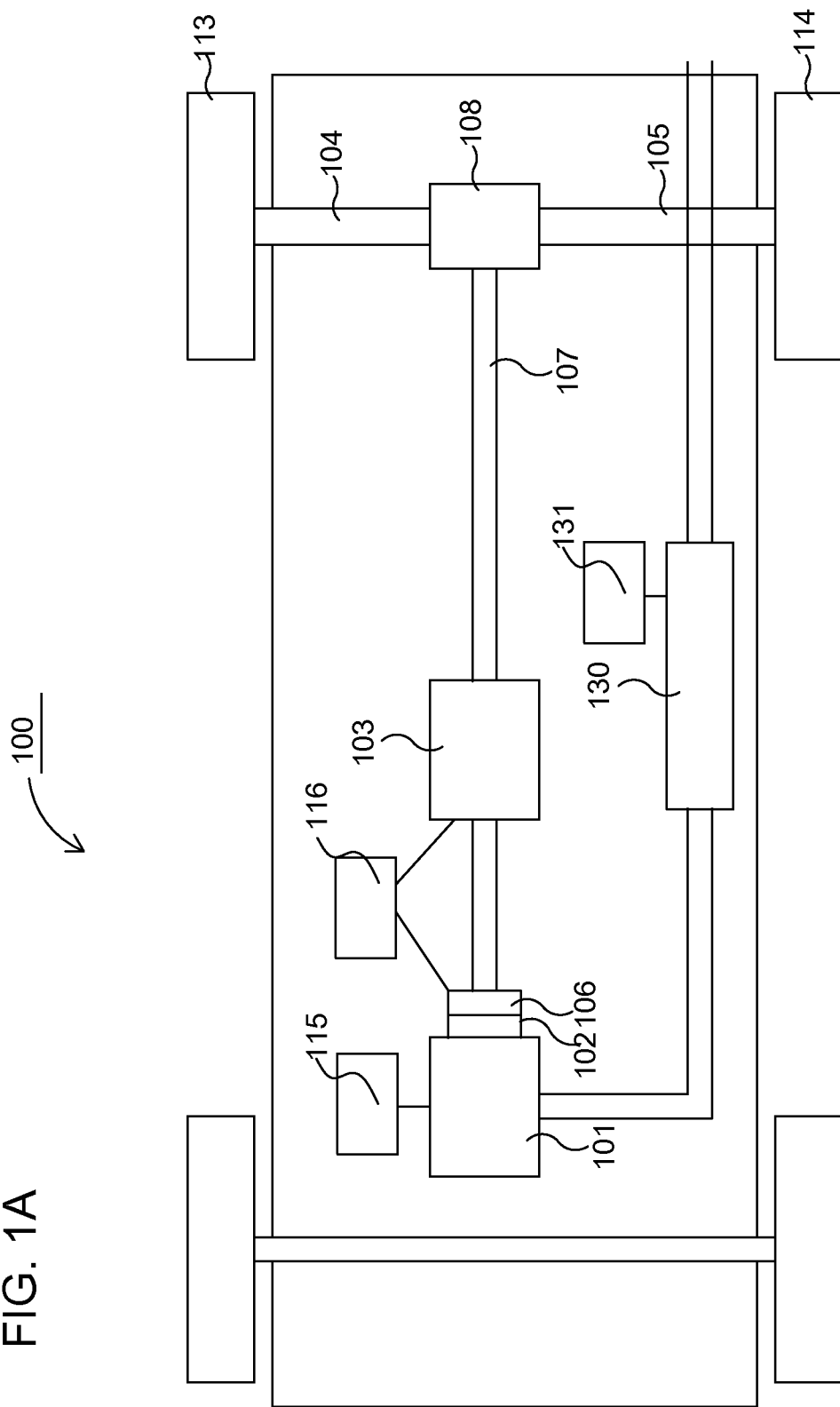
FIG. 1A illustrates a power train of an exemplary vehicle in which the present invention advantageously can be utilized.

FIG. 1A schematically depicts a power train of an exemplary vehicle 100. The power train comprises a power source, in the present example an internal combustion engine 101, which, in a conventional manner, is connected via an output shaft of the internal combustion engine 101, normally via a flywheel 102, to a gearbox 103 via a clutch 106. An output shaft 107 from the gearbox 103 propels drive wheels 113, 114 via a final gear 108, such as a common differential, and half shafts 104, 105 connected to said final gear 108.

The internal combustion engine 101 is controlled by the vehicle control system via a control unit 115. The clutch 106 and gearbox 103 are also controlled by the vehicle control system by means of a control unit 116.

FIG. 1A, consequently, discloses a powertrain of a specific kind, but the invention is applicable in any kind of power train and also e.g. in hybrid vehicles. The disclosed vehicle further comprises an aftertreatment system 130 for aftertreatment (purifying) of exhaust gases that results from combustion in the internal combustion engine 101. The functions of the aftertreatment system 130 are controlled by means of a control unit 131.

The aftertreatment system 130 can be of various kinds and designs, and according to the disclosed embodiment an additive is supplied to the exhaust gas stream. An example of an aftertreatment system 130 in which the present invention can be utilized is shown more in detail in FIG. 2, and in the disclosed exemplary embodiment the aftertreatment system 130 comprises a selective catalytic reduction (SCR) catalytic converter 201. The aftertreatment system can also comprise further non-disclosed components, such as, for example, further catalytic converters and/or particle filters which can be arranged upstream or downstream the SCR catalytic converter 201.

The supply of additive can, according to the above, for example, be used in the reduction of the concentration of nitric oxides $NO_x$ in the exhausts from the internal combustion engine through the use of an SCR catalytic converter.

This additive can, as according to the disclosed embodiment, for example be an additive comprising urea as reagent and e.g. consist of AdBlue which constitutes a frequently used additive and which consists of a mixture of approximately 32.5% urea dissolved in water. Urea forms ammonium when heated, and the ammonium then reacts with nitric oxides $NO_x$ in the exhaust gas stream. The present invention is applicable when using AdBlue, as well as when using any other urea based additive. As was mentioned above, the invention is also applicable when using any kind of additive comprising other reagents, and where any suitable substance in the exhaust gas stream is reduced/treated using the additive.

Figure 2:
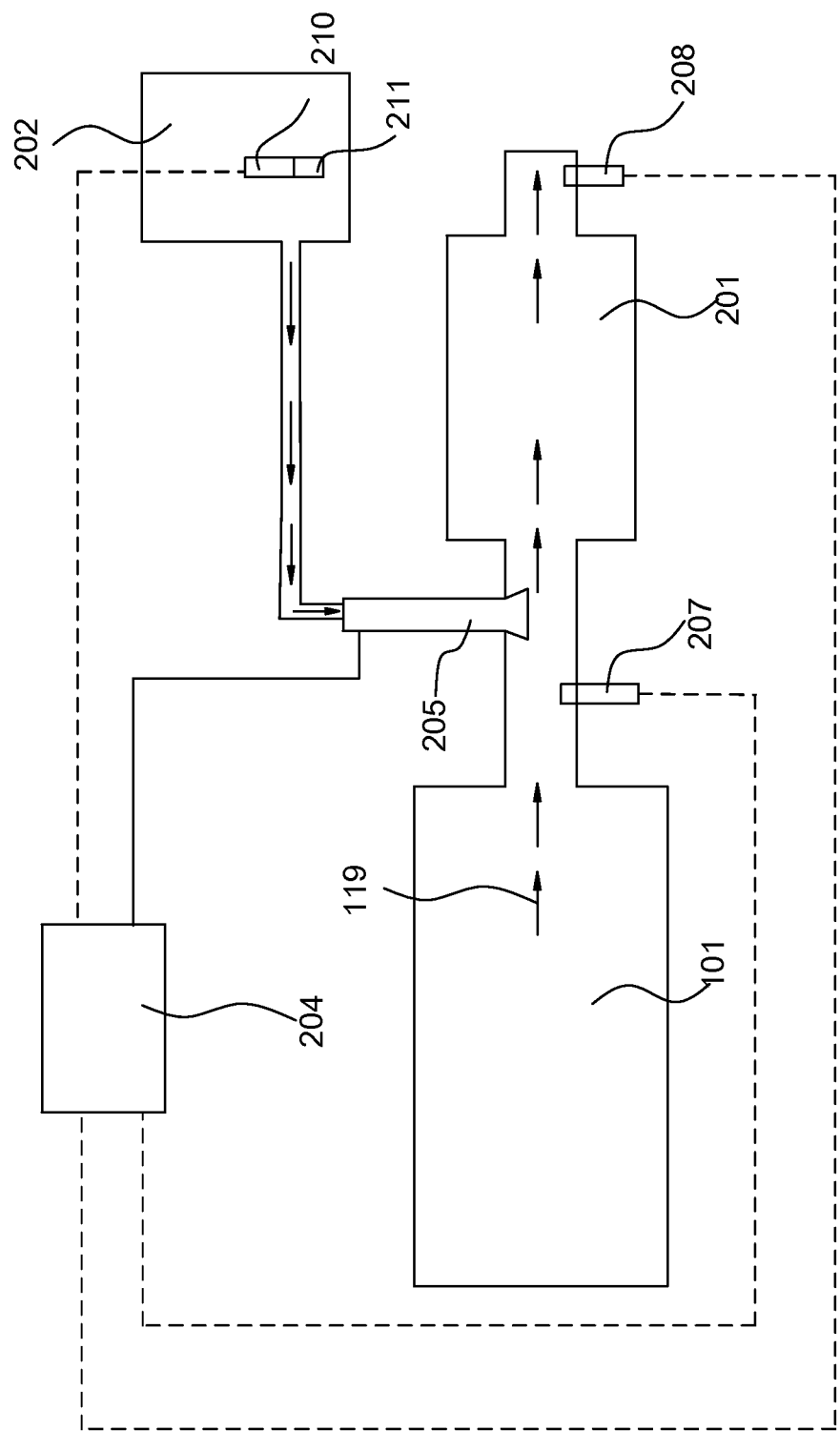
FIG. 2 illustrates an example of an aftertreatment system where a supply of additive is utilized and with which the present invention advantageously can be utilized.

Apart from said catalytic converter 201, FIG. 2 further discloses an additive dosing system, in the disclosed example a urea dosing system (UDS), which comprises a urea, or dosing, tank 202, which is connected to an injection nozzle 205 through the use of which additive is injected into the exhaust gas stream 119. The dosing of urea is controlled by a UDS control unit 204, which generates control signals for controlling the supply of additive so that a desired amount is injected into the exhaust gas stream 119 from the tank 202 using the injection nozzle 205. An armature 210 is arranged in the tank 202 and comprises a quality sensor 211 for diagnosing the supply of additive.

Dosing systems for the supply of additive are in general well described in the prior art, and the precise manner in which the supply of additive is dosed/performed is therefore not described in detail herein. However, as was mentioned above, the dosing is subject to adaptation, or correction. In the following the term correction is used, and correction can be performed e.g. at regular intervals and aims to ensure that the injected amount of additive corresponds to the demand. In general, the dosing varies, in principle, continuously as the operating conditions changes and the generation, in this example, of nitric oxides therewith. The dosing as a function of time may therefore vary e.g. according to curve 401 of FIG. 4, where the curve 401 follows some predicted dosing requirement in dependence of the current operation and prevailing temperatures in the system. For example, at time $t_i$ a quantity $q_i$ is injected.

For example, an SCR catalytic converter is capable of storing different amounts of ammonium for different prevailing catalytic converter temperatures, as is known per se. However, the amount of additive actually needed in reality may differ from the predetermined amount. This may, for example, be because of various reasons. For example, the amount of additive being supplied may be at an erroneously low or high level. Also, the quality/concentration of the additive may differ from the quality/concentration of the additive for which dosing amounts were determined. Further, the mass flow of the exhaust gases entering the aftertreatment may also be at an erroneously low or high level. Another example is that measurement of the substance downstream the supply of additive is erroneous, or a measured or modelled occurrence of the substance to be reduced upstream the supply of additive is not correct. In addition, e.g. wear and/or aging and/or faulty components, such as the catalytic converter, may affect the actual amount being injected. The above factors may also differ from one vehicle to another.

For this reason, an adaptation, or correction, is performed, e.g. at regular intervals, where e.g. a correction factor is applied to quantities being injected to account for such variations.

This can be accomplished, for example, by comparing an actual reduction e.g. using sensors before and after the supply of additive with an expected amount, where correction can be applied when the actual reduction differs from the expected. As was mentioned above, such correction may usually be performed up to point. That is, the predetermined amount for injection is only corrected until a maximum limit has been reached. When the maximum limit has been reached it is considered that no further corrected can be performed by further increasing the injected quantity. For example, the intended amount for injection can be allowed to increase by some suitable percentage, such as a percentage in the interval 40-60%. If the maximum correction still does not solve the problem no further attempts are being made, but the system is considered as malfunctioning in this regard.

Figure 4:
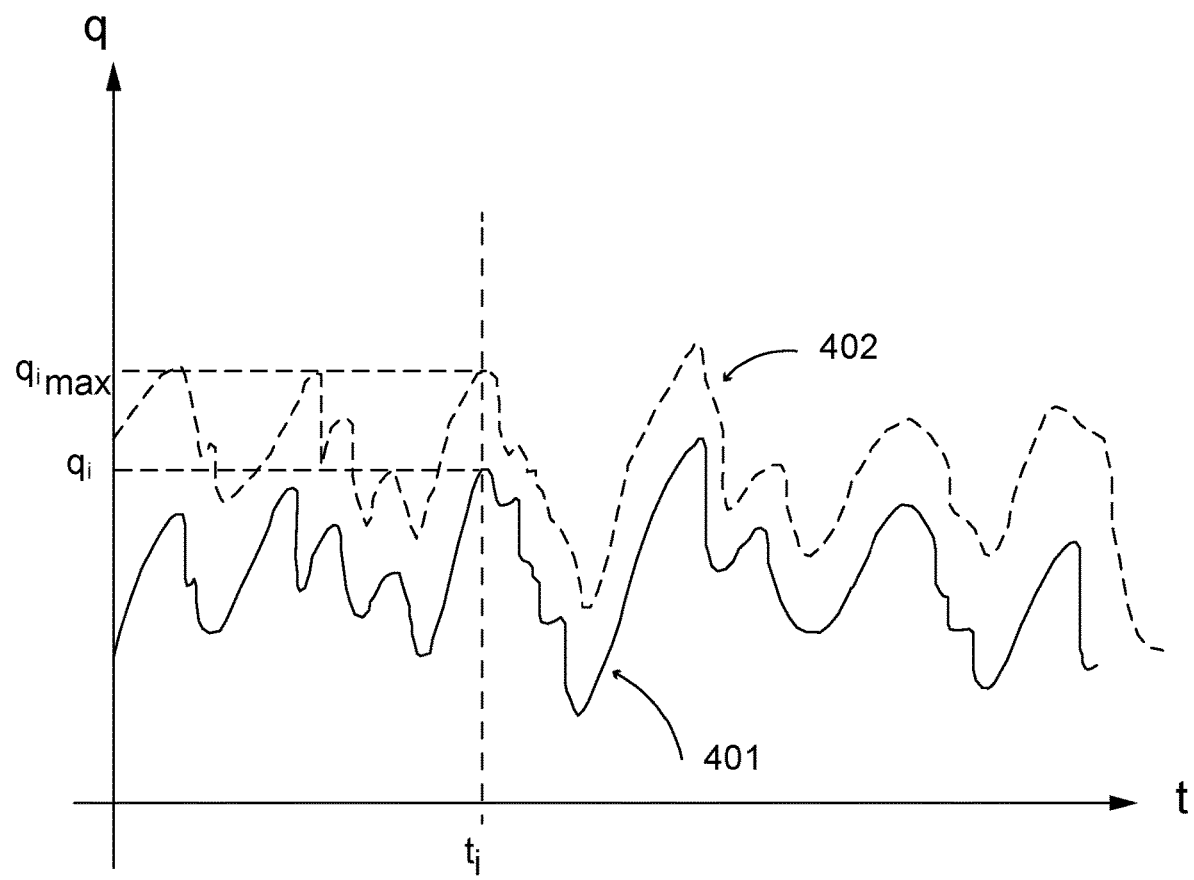
FIG. 4 illustrates variations in supply of additive over time.

The curve 402 in FIG. 4 exemplifies the maximum correction that is applied, which hence is a maximum correction for any given moment. Hence the maximum allowed dosing $q_{max}$ for any moment t will also differ in dependence of the prevailing operating conditions. In general, dilution of the additive can be compensated for to some extent by increasing the amount of additive being supplied to the exhaust gas stream.

The present invention relates to a method for reducing the occurrence of restrictions regarding work produced by combustion when the reduction of a substance in the exhaust gas stream is considered insufficient, and this is accomplished according to the present example by a method where it is required that various determinations confirm the insufficient reduction or at least does not indicate to the contrary.

Figure 3:
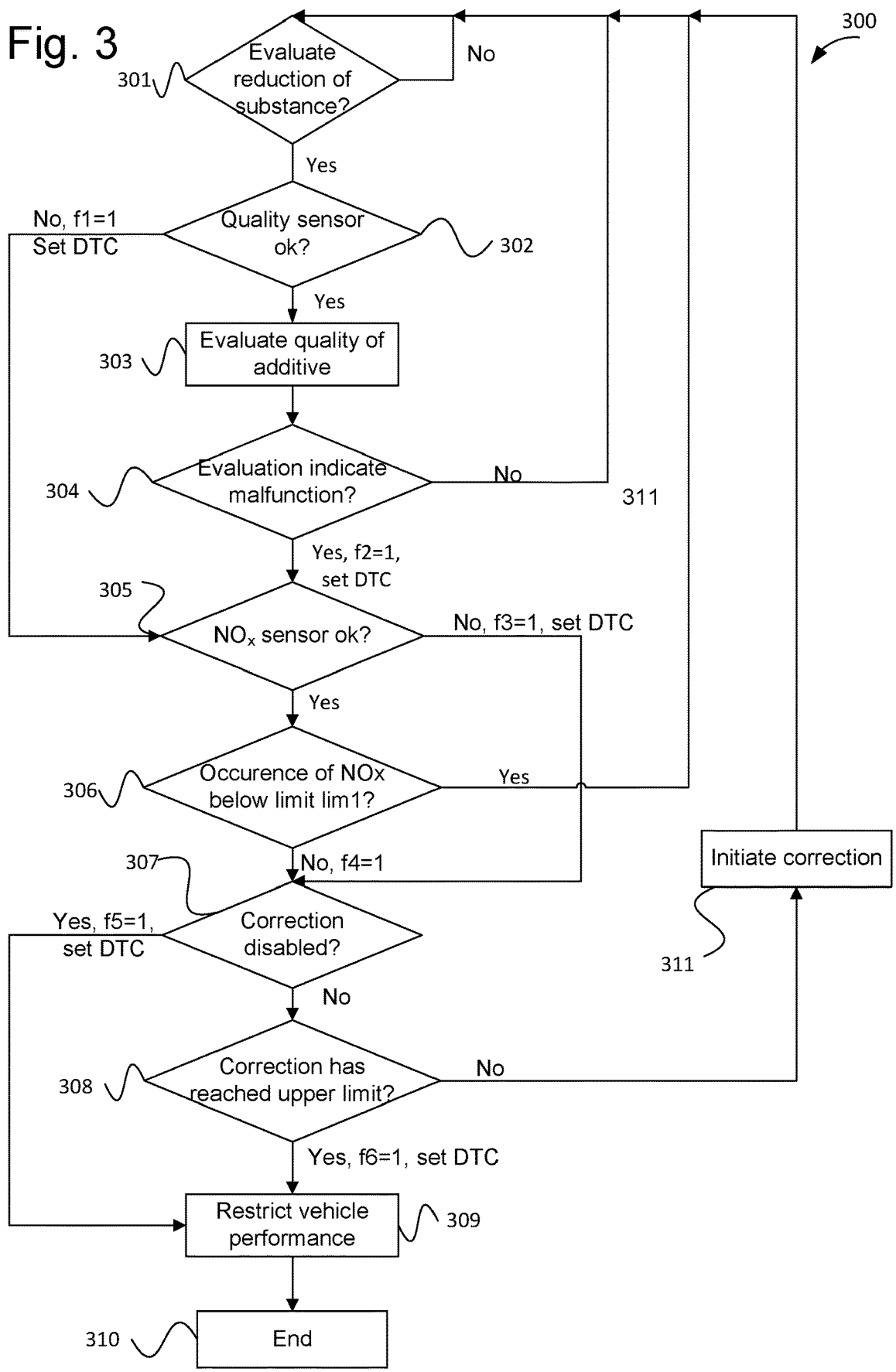
FIG. 3 illustrates an exemplary method according to one embodiment of the present invention.

In particular, the present invention provides a method that reduces the risk of situations arising where restrictions are imposed because a fault with regard to the reduction is indicated, but where in reality no fault exist. An exemplary method 300 of the present invention is shown in FIG. 3, which method can be implemented at least partly e.g. in the control unit 204 for controlling of the urea dosing system. As indicated above, the functions of a vehicle are, in general, controlled by a number of control units, and control systems in vehicles of the disclosed kind generally comprise a communication bus system consisting of one or more communication buses for connecting a number of electronic control units (ECUs), or controllers, to various components on board the vehicle. Such a control system may comprise a large number of control units, and the control of a specific function may be divided between two or more of them.

For the sake of simplicity, FIGS. 1A, 2 depicts only control units 115-116, 130, 204, but vehicles 100 of the illustrated kind are often provided with significantly more control units, as one skilled in the art will appreciate. Control units 115-116, 130, 204 are arranged to communicate with one another and various components via said communication bus system and other wiring, partly indicated by interconnecting lines in FIG. 1A.

The present invention can be implemented in any suitable control unit in the vehicle 100, and hence not necessarily in the control unit 204. The diagnostics of the urea dosing according to the present invention will usually depend on signals being received from other control units and/or vehicle components, and it is generally the case that control units of the disclosed type are normally adapted to receive sensor signals from various parts of the vehicle 100. The control unit 204 will, for example, receive signals from e.g. quality sensor 211 and/or $NO_x$ sensors 207, 208. Control units of the illustrated type are also usually adapted to deliver control signals to various parts and components of the vehicle, e.g. to the engine control unit or other suitable control unit when tests indicate that performance of the vehicle should be restricted.

Control of this kind is often accomplished by programmed instructions. The programmed instructions typically consist of a computer program which, when executed in a computer or control unit, causes the computer/control unit to exercise the desired control, such as method steps according to the present invention. The computer program usually constitutes a part of a computer program product, wherein said computer program product comprises a suitable storage medium 121 (see FIG. 1B) with the computer program 126 stored on said storage medium 121. The computer program can be stored in a non-volatile manner on said storage medium. The digital storage medium 121 can, for example, consist of any of the group comprising: ROM (Read-Only Memory), PROM (Programmable Read-Only Memory), EPROM (Erasable PROM), Flash memory, EEPROM (Electrically Erasable PROM), a hard disk unit etc., and be arranged in or in connection with the control unit, whereupon the computer program is executed by the control unit. The behavior of the vehicle in a specific situation can thus be adapted by modifying the instructions of the computer program.

Figure 1B:
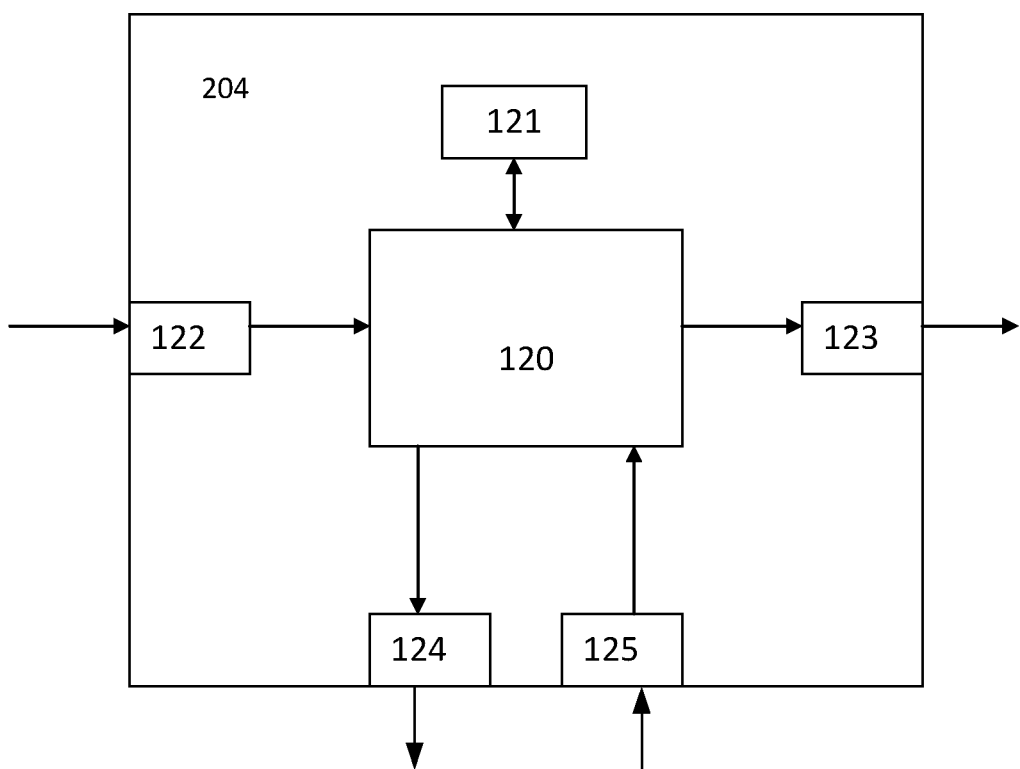
FIG. 1B illustrates an example of a control unit in a vehicle control system.

An exemplary control unit (the control unit 204) is shown schematically in FIG. 1B, wherein the control unit can comprise a processing unit 120, which can consist of, for example, any suitable type of processor or microcomputer, such as a circuit for digital signal processing (Digital Signal Processor, DSP) or a circuit with a predetermined specific function (Application Specific Integrated Circuit, ASIC). The processing unit 120 is connected to a memory unit 121, which provides the processing unit 120, with e.g. the stored program code 126 and/or the stored data that the processing unit 120 requires to be able to perform calculations. The processing unit 120 is also arranged so as to store partial or final results of calculations in the memory unit 121.

Furthermore, the control unit 204 is equipped with devices 122, 123, 124, 125 for receiving and transmitting input and output signals, respectively. These input and output signals can comprise waveforms, pulses or other attributes that the devices 122, 125 for receiving input signals can detect as information for processing by the processing unit 120. The devices 123, 124 for transmitting output signals are arranged so as to convert calculation results from the processing unit 120 into output signals for transfer to other parts of the vehicle control system and/or the component (s) for which the signals are intended. Each and every one of the connections to the devices for receiving and transmitting respective input and output signals can consist of one or more of a cable; a data bus, such as a CAN bus (Controller Area Network bus), a MOST bus (Media Oriented Systems Transport) or any other bus configuration, or of a wireless connection.

Figure 5:
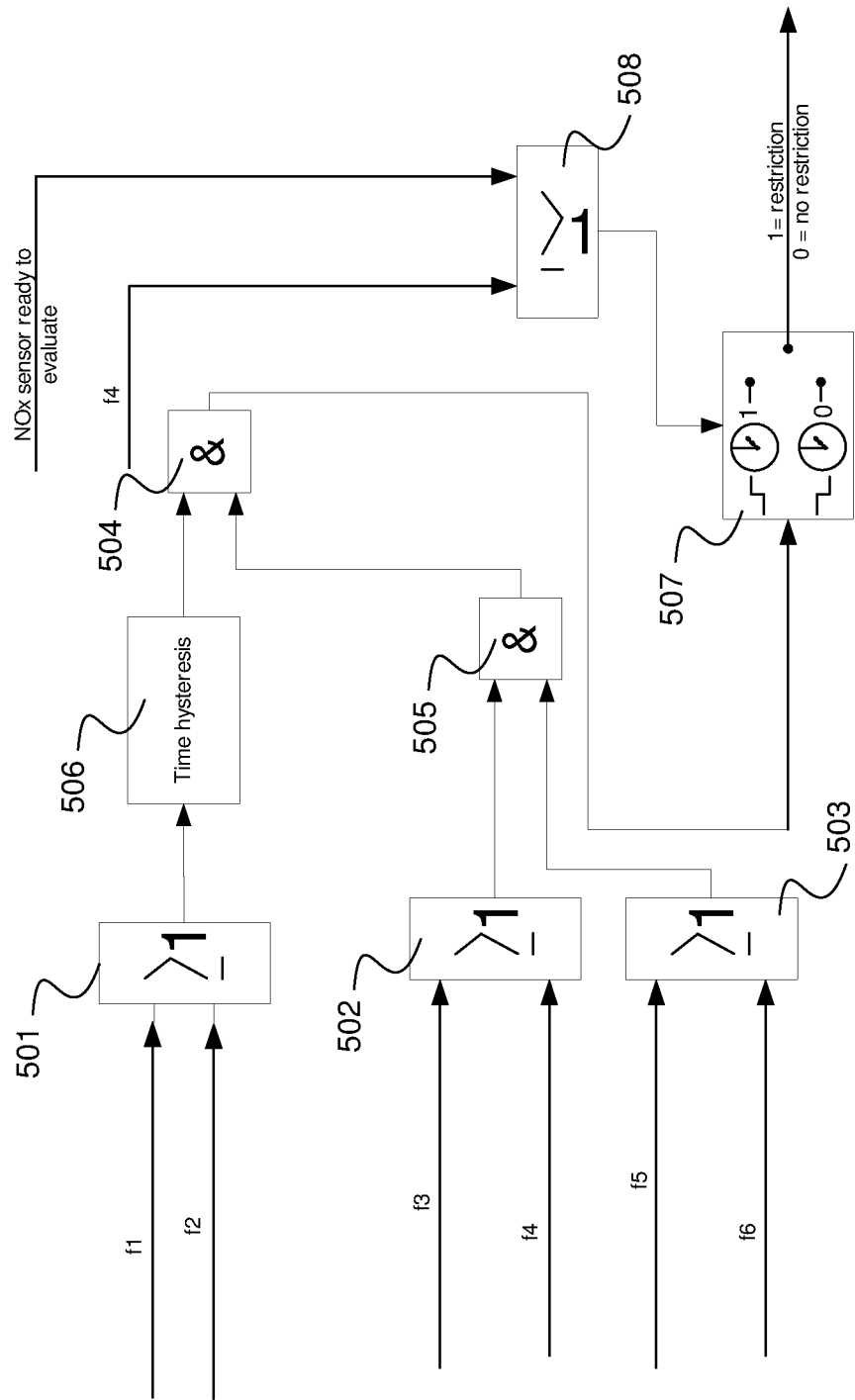
FIG. 5 illustrates an exemplary logic for implementing embodiments of the invention.

Returning to the exemplary method 300 illustrated in FIG. 3, it is first to be noted that a number of flags are used in the example. These flags can be omitted according to the specific example of FIG. 3. The flags are, however, useful for simplifying illustration purposes with regard to a logic design exemplified in FIG. 5. The method starts in step 301, where it is determined whether the reduction of a substance, such as e.g. $NO_N$, is to be evaluated. The method remains in step 301 for as long as this is not the case. The method continues to step 302 when it is determined that the reduction of a substance is to be diagnosed. The transition from step 301 to step 302 can, for example, be initiated according to various criteria. For example, the diagnostics can be arranged to be performed at regular intervals. Also, the diagnostics can be arranged to be performed e.g. each time the internal combustion engine 101 is started and/or each time there is an indication that a refill of additive has taken place. The transition can also be arranged to be performed if there is an indication of malfunctioning reduction of, in this example, $NO_x$. The method of FIG. 3 can also be arranged to be performed continuously.

In step 302 a first evaluation regarding the reduction of a substance is initiated. According to the exemplary embodiment a diagnostic of the supply of additive using the quality sensor 211 is performed. In step 302 it is first determined whether it can be assumed that the quality sensor 211 is working properly/correctly, or whether the sensor 211 is assumed to be malfunctioning. This can, for example, be determined by the magnitude of received sensor signals, and/or presence or lack of sensor signals. When the quality sensor 211 is determined to be working properly/correctly, the method continues to step 303. When it is concluded that the quality sensor 211 is not working properly/correctly, the method continues to step 305, while simultaneously a flag f1 is set to some suitable value, e.g. "1", indicating a malfunction. One or more diagnostic trouble codes (DTC) with regard to the malfunctioning sensor 211 can also be set. The causes resulting in activated trouble codes can be looked into e.g. the next time the vehicle is taken in for service. At this stage, however, no restrictive measures are being taken, and hence service must not necessarily be performed within a certain time.

When it is concluded in step 302 that the quality sensor 211 is assumed to be working properly/correctly, the method continues to step 303, the flag f1 not being set, where the quality of the additive is evaluated based on the sensor signals received from quality sensor 211. The method then continues to step 304, where it is determined whether this evaluation indicates that the supply of an additive deviates from an expected supply in some aspect. For example, the chemical composition of the additive can be diagnosed in step 303. When it is determined in step 304 that there is a deviation with regard to chemical composition, a flag f2 is set, e.g. to "1", to indicate a malfunction in this regard instead, and the method continues to step 305. One or more diagnostic trouble codes (DTC) can also be set, in this case indicating e.g. insufficient quality of the additive. If the additive is considered to be of sufficient quality, the method returns to step 301 to be ready for a new evaluation when considered appropriate, since in this case the reduction is considered to function properly/correctly.

With regard to the determination of the chemical composition, the quality sensor 211 can, for example, be arranged such that the speed of sound in the additive is measured. This can be accomplished by transmitting a signal towards a surface at a known distance and measure the time it takes for the signal to travel there and back. Quality sensors of this kind are known in the art, and it is generally the case that the speed of sound in a liquid changes with the composition of the liquid. This means that a determination of the speed of sound in the liquid in the dosing tank can be used to evaluate the chemical composition of the additive by comparing the obtained speed of sound with an expected speed of sound, where a malfunction can be assumed e.g. when the deviation from an expected value exceeds some suitable limit.

Alternatively, or in addition, the speed of sound can be stored in the vehicle control system for a number of different concentrations/liquids, so that an obtained speed of sound can be compared with stored values and translated into a corresponding concentration of e.g. urea, or assumed liquid.

When the comparison indicates use of a liquid that does not fulfil set requirements, this can be used as an indication of a malfunction. However, the deviation may be caused e.g. by frozen additive in the tank, and hence the additive may be of proper quality also in situations where the sensor indicates otherwise. Consequently, a quality sensor, such as a urea quality sensor, can be used to determine the quality of additive and thereby diagnose of the supply of additive.

In step 305, a second evaluation of the reduction is initiated. The second evaluation can, for example, be a determination of the current conversion rate, or reduction rate, of the substance to be reduced. For example, a determination of the $NO_x$ reduction rate can be performed. This can be performed by estimating the presence of $NO_x$ before and after the supply of additive through the use of sensors 207, 208, and comparing these estimations and a conversion rate be calculated, which can then be compared with an expected conversion rate. In this way, it can be determined whether a desired conversion, i.e. reduction, is taking place and thereby whether the supply of additive can be assumed to be performed in a desired manner.

The evaluation of the reduction can be performed using any suitable sensor setup, using one or two or more sensors. According to the present example, the evaluation of the reduction is determined by determining whether the emissions of the reduced substance fulfils some suitable criterion, such as being below some limit. This limit can, for example, correspond to a legislative limit regarding allowed emissions of the substance. Such limits may be expressed e.g. in emissions per work unit produced by the engine, e.g. emissions per kWh.

These measurements are performed using sensor signals from sensor 208 which measures emissions downstream the reduction and hence, in principle, tailpipe emissions. In step 305 it is first determined whether it can be assumed that the $NO_x$ sensor 208 is working properly/correctly, or whether the sensor 208 is assumed to be malfunctioning. This can, for example, be determined by the magnitude of received sensor signals, and/or presence or lack of sensor signals. When $NO_x$ sensor 208 is determined to be working properly/correctly, the method continues to step 306. If it is concluded that $NO_x$ 208 is not working properly/correctly, the method continues to step 307. Simultaneously one or more appropriate trouble codes can be activated for later attendance when the vehicle is taken to service. Also, a flag f3 is set. However, no restrictive measures are being taken at this point.

When the $NO_x$ sensor 208 is deemed to be working properly/correctly, it is determined in step 306 whether the occurrence of $NO_x$ in the exhaust gas stream following the reduction is below a limit lim1. As was mentioned above, this limit can be arranged to correspond to a legislative limit regarding allowed emissions, and e.g. consist of emissions in grams per kWh produced by the engine 101. When it is determined that the $NO_x$ emissions are below the limit lim1, reduction is considered to work properly/correctly, and the method returns to step 301 to be ready for a new evaluation, since in this case the reduction is considered to function properly/correctly irrespective of the indications with regard to quality sensor/measurements. That is, sensor signals being delivered by the quality sensor 211 may not reflect an actual status of the system operation. Therefore, in this case, no restrictive measures are being taken even if the quality of the additive is not sufficient according to the quality sensor. Reasons for this can be determined in later diagnostics when the vehicle is taken in for service. If, on the other hand, it is determined in step 306 that the estimated emissions do not fulfil the requirements, e.g. exceeding the limit lim1, the method continues to step 307. A flag f4 is also set.

In step 307 it is determined whether the correction is disabled. That is, whether correction of the supply of additive can be performed, or whether for some reason correction is disabled. If the correction is disabled, the method continues to step 309, while simultaneously a flag f5 and, where appropriate, diagnostic trouble codes are set. When correction is considered to be operating properly/correctly and hence can be performed, the method continues to step 308 where it is determined whether the correction of the supply of additive has reached an upper limit, i.e. maximum allowed amounts for injection according to system calibrations, i.e. injection is already performed according to curve 402 for the exemplary scenario of FIG. 4, and no further increase in injected amount will be performed.

For as long as this is not the case, the method returns to step 301, e.g. via a step 311 initiating correction of the supply of additive to increase the supplied amount in an attempt to overcome deficiencies in the reduction of $NO_x$ before any restrictive measures is taken. The method of FIG. 3 can then be repeated, e.g. at some suitable time following a correction to determine if emissions have improved following the correction. If emissions still do not fulfil requirements when correction has reached the maximum limit, the method continues to step 309 according to the below.

If the correction has reached the upper limit, and hence no further increase in injected amount of additive is available, the method continues from step 308 to step 309. Appropriate trouble codes can be set. If the method reaches step 309, it has been concluded that the quality of the additive is either poor or the quality sensor considered to not work/function/operate properly/correctly. Further, the occurrence of the substance in the exhaust gas stream is too high, or alternatively the sensor is not working/functioning properly/correctly. Finally the correction has reached its maximum value or is not working/functioning properly/correctly. In this situation restrictive measures are taken in step 309.

These measures can, for example, be arranged to follow the legislative rules that apply in the region in which the vehicle presently is travelling. The measures may constitute a restriction where the work produced by the internal combustion engine is limited, e.g. by restricting the maximum available power and/or maximum vehicle speed. The limitations may be arranged to be applied some suitable number of hours after the error is detected to allow the vehicle to be driven to a suitable service shop/return home. For example, according to the European EURO VI legislation, restrictive measures may be such that actual limitation of internal combustion engine work is started 10 hours after the restrictive measure is taken with regard to reduction in torque produced by the internal combustion engine. With regard to reduction in vehicle speed, restrictions may be taken 20 hours after restrictive measure is taken. Different times may apply when it is determined that the quality sensor is malfunctioning, e.g. 36 hours and 100 hours, respectively. Also, different jurisdictions may prescribe different restrictive measures to be taken. The method is then ended in step 310.

The present invention, consequently, provides a solution where restrictive measures are not taken solely based on an evaluation of e.g. quality of additive but further indications are required in order to actually take restrictive measures. For as long as any of the evaluations indicate that a problem may not occur or may be correctable, this is duly noted by setting of appropriate diagnostic trouble codes, and possibly store related data, but no restrictions are applied.

Consequently, e.g. a malfunctioning quality sensor is not in itself sufficient to take restrictive measures. Further indication of a fault is required to initiate restrictions of vehicle performance.

With regard to the method disclosed in FIG. 3 flags f1-f6 need not be used. The structure of the flow chart will have the same result anyway. As was mentioned above, however, the flags, or corresponding functionality, may be used and are useful for illustration purposes, and other systems designs are of course possible. For example, FIG. 5 discloses an exemplary logic design 500 of the invention, where additional functionality has been added and where the flags f1-f6 are used to simplify illustration. In OR-block 501 it is determined whether any of the flags f1 and f2 relating to the quality sensor according to the above are set, and if so OR-block 501 outputs a logical high value.

OR block 502 operates similarly with regard to the $NO_x$-sensor, and hence flags f3, f4. Correspondingly OR block 503 takes as input flags f5-f6 relating to the correction. The output signals from blocks 502, 503 are input to an AND block 505. The output from AND block 505 is input to AND block 504. The output from OR block 501 is also input to AND block 504. However, the signal from OR block 501 first passes an optional time hysteresis block 506, which can be used to ensure that inferior quality of the additive is not only temporary, and hence requiring that the inferior quality is indicated also after e.g. some suitable number of minutes after either of flags f1, f2 have been set before a logical high is forwarded to block 504.

If any of the flags f1, f2; any of the flags f3, f4 and any of the flags f5, f6 are set the resulting output from AND block 504 will be a logical high. This output is input to an evaluation block 507, which imposes a restriction of the work produced by the internal combustion engine if the input is high. The evaluation of block 507 can, however, be dependent on the condition that either f4 is set, i.e. the NOx sensor 208 is not working/functioning properly/correctly, or the NOx sensor 208 being able to provide accurate measurements when working/functioning properly/correctly. This may not always be the case. For example, the performing of a correction may change the amount of surplus additive that has been added and stored in the SCR catalytic converter, which may then affect measurements for some time. This is determined by OR block 508, which consequently can ensure that determination is not performed until some time has lapsed since a correction was carried out. This in order to ensure that measurements are not affected by conditions prevailing during correction.

According to the above, the invention has been exemplified using particular kinds of evaluations. As is obvious to a person skilled in the art, the order in which e.g., evaluations are performed is not relevant to the present invention, and the evaluations can performed in any order and/or simultaneously.

Finally, the present invention has been exemplified for a vehicle. The invention is, however, applicable in any kind of craft, such as, e.g., aircrafts, watercrafts and spacecrafts. The invention is also applicable for use in combustion plants. Also, the aftertreatment system may comprise further components such as one or more particle filters, one or more oxidation catalytic converters as is known per se. It is also contemplated that the aftertreatment system may comprise more than one SCR catalytic converter.

The invention claimed is:

1. A method for restricting work produced by combustion in at least one combustion chamber, wherein an aftertreatment system is arranged for reduction of at least one substance resulting from said combustion by supplying an additive comprising a reagent to an exhaust gas stream resulting from said combustion, wherein the quantity of additive being supplied is subjectable to correction, the method comprising:
   determining if a quality of said additive, estimated by means of a first sensor being subjected to said additive, is below a first quality;
   determining if signals from a second sensor indicate insufficient reduction of said at least one substance said second sensor being subjected to the exhaust gas stream and arranged to measure an occurrence of said at least one substance;
   determining if said correction has reached an upper limit; and
   restricting work produced by said combustion only when:
   said estimated quality of said additive is below said first quality, said correction has reached said upper limit, and said measurement in the exhaust gas stream indicates insufficient reduction of said at least one substance.

2. A method according to claim 1, further comprising:
   determining that the quality of said additive is below the first quality, when it is indicated that said first sensor is not functioning properly.

3. A method according to claim 1, wherein said first sensor is a quality sensor being arranged to diagnose at least one property with regard to said additive.

4. A method according to claim 1, further comprising:
   determining that reduction of said at least one substance is insufficient, when it is indicated that said second sensor is not functioning properly.

5. A method according to claim 1, further comprising:
   determining that reduction of said at least one substance ($NO_x$) is insufficient when signals from said second sensor indicates an occurrence of said first substance exceeding a first occurrence.

6. A method according to claim 1, further comprising:
   determining that said correction has reached said upper limit when it is indicated that said correction is not functioning properly.

7. A method according to claim 1, further comprising:
   determining that said correction has reached said upper limit when the supply of additive has reached a maximum allowed supply.

8. A method according to claim 1, further comprising:
   determining if a first time has lapsed since a correction has been carried out; and
   determining if signals from said second sensor indicate insufficient reduction of said at least one substance when said first time has lapsed.

9. A method according to claim 1, further i comprising, when a quality of said additive is below said first quality:
   determining if a second time has lapsed since the quality of said additive has been determined as below said first quality; and
   determining that the quality of said additive is below said first quality only when the quality of said additive is determined as below said first quality and also when said second time has lapsed.

10. A method according to claim 1, wherein said at least one combustion chamber is a combustion chamber of an internal combustion engine in a vehicle said restriction of said combustion being such that a maximum power of said internal combustion engine is restricted and/or such that the maximum speed of said vehicle is limited to a first speed.

11. A method according to claim 1, further comprising:
restricting said work produced by said combustion only when a period of time has lapsed since it has been determined that said estimated quality of said additive is below said first quality, said correction has reached said upper limit, and said measurement in the exhaust gas stream indicates insufficient reduction of said at least one substance.

12. A computer program product comprising computer program code stored on a non-transitory computer-readable medium, said computer program product for restricting work produced by combustion in at least one combustion chamber, wherein an aftertreatment system is arranged for reduction of at least one substance resulting from said combustion by supplying an additive comprising a reagent to an exhaust gas stream resulting from said combustion, wherein the quantity of additive being supplied is subjectable to correction, said computer program product comprising computer instructions to cause one or more computer processors to perform the following operations:
   determining if a quality of said additive, estimated by means of a first sensor being subjected to said additive, is below a first quality;
   determining if signals from a second sensor indicate insufficient reduction of said at least one substance, said second sensor being subjected to the exhaust gas stream and arranged to measure an occurrence of said at least one substance;
   determining if said correction has reached an upper limit; and
   restricting work produced by said combustion only when: said estimated quality of said additive is below said first quality, said correction has reached said upper limit, and said measurement in the exhaust gas stream indicates insufficient reduction of said at least one substance.

13. A system for restricting work produced by combustion in at least one combustion chamber, wherein an aftertreatment system is arranged for reduction of at least one substance resulting from said combustion by supplying an additive comprising a reagent to an exhaust gas stream resulting from said combustion, wherein the quantity of additive being supplied is subjectable to correction, the system comprising:
   means for determining if a quality of said additive, estimated by means of a first sensor being subjected to said additive, is below a first quality;
   means for determining if signals from a second sensor indicate insufficient reduction of said at least one substance, said second sensor being subjected to the exhaust gas stream and arranged to measure an occurrence of said at least one substance;
   means for determining if said correction has reached said upper limit; and
   means for restricting work produced by said combustion only when: said estimated quality of said additive is below said first quality, said correction has reached said upper limit, and said measurement in the exhaust gas stream indicates insufficient reduction of said at least one substance.

14. A system according to claim 13, wherein said first sensor is a quality sensor that is arranged in a tank comprising said additive.

15. A vehicle comprising a system for restricting work produced by combustion in at least one combustion chamber, wherein an aftertreatment system is arranged for reduction of at least one substance resulting from said combustion by supplying an additive comprising a reagent to an exhaust gas stream resulting from said combustion, wherein the quantity of additive being supplied is subjectable to correction, the system comprising:
   means for determining if a quality of said additive, estimated by means of a first sensor being subjected to said additive, is below a first quality;
   means for determining if signals from a second sensor indicate insufficient reduction of said at least one substance, said second sensor being subjected to the exhaust gas stream and arranged to measure an occurrence of said at least one substance;
   means for determining if said correction has reached said upper limit; and
   means for restricting work produced by said combustion only when: said estimated quality of said additive is below said first quality, said correction has reached said upper limit, and said measurement in the exhaust gas stream indicates insufficient reduction of said at least one substance.

* * * * *